United States Patent Office 2,891,029
Patented June 16, 1959

2,891,029

POLYMERS OF VINYLIDENE MONOMERS DESTATICIZED WITH PARTIALLY HYDROXYALKYLATED ALKYLENE DIAMINES

Myron A. Coler, Scarsdale, and Arnold S. Louis, Riverdale, N.Y.

No Drawing. Application March 30, 1956
Serial No. 574,950

15 Claims. (Cl. 260—32.6)

This invention relates to improved synthetic resin molding compositions and methods of making same and, in particular, to such molding materials which avoid the highly undesirable effects of electrostatic charge buildup during the molding operations.

This application is a continuation-in-part of our copending application entitled "Non-Electrostatic Molding Compositions," Serial Number 556,400, filed on December 30, 1955 and assigned to the assignee of this application and abandoned in favor of the present application.

It has been found that the process of molding certain synthetic resins causes the generation of high electrostatic charges. This evidences itself frequently by the formation of "crows feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is relatively moisture-free and thus subject to the accumulation of electrostatic charges at the time of molding.

Still other prior known additives which are inherently destaticizing agents tend to undesirably affect the physical properties of the plastic. For example, a lowering of the heat distortion point may occur. There may also be a change in color, gloss, hardness or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and, in particular, which is not susceptible to electrostatic charging during the molding operation or upon release from the mold.

This invention does not depend on deliquescent action and therefore, reduces results substantially independent of humidity. This advantage of the invention is important in the elimination of the tendency for dust patterns to form on freshly molded plastic articles.

We have found that selected hydroxyalkylated alkylene diamines may be incorporated into synthetic molding compositions to provide anti static properties.

A totally unexpected advantage of the above named group of additives was discovered during molding tests of material prepared in accordance with this invention. It was found that the additives disclosed hereinafter improved flow properties of the base plastic so as to permit shorter molding cycles as well as improved filling of thin mold sections; reduced breakage of thin-walled moldings and easier mold release were obtained.

An object of this invention is, therefore, to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during and especially immediately after the molding operation.

Another object is to provide articles comprising polystyrene compositions which are free of the effects of electrostatic charges.

Still another object of this invention is to provide an improved plastic composition and methods of making same.

A still different object is to reduce the electrostatic charge on polystyrene objects made by injection moldings.

A further object of this invention is to provide a polystyrene composition of superior molding properties.

Further objects and advantages will become apparent and still others will be pointed out with particularity as the following detailed description proceeds.

We have found that certain hydroxyalkylated alkylene diamines when incorporated in resinous polymer molding compositions impart highly desirable anti-static properties.

These diamines comprise the monohydroxyalkyl alkylene diamines, the dihydroxyalkyl alkylene diamines and the trihydroxyalkyl alkylene diamines.

Their chemical structures may be represented as follows:

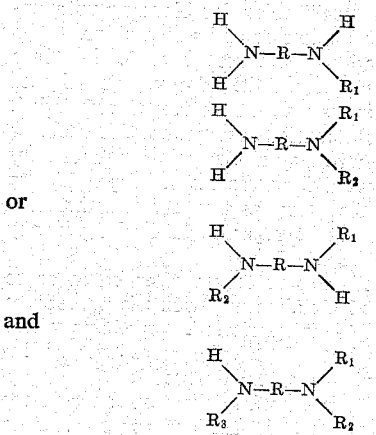

or and wherein: R represents an alkylene radical containing from 2 to 6 carbon atoms $R_1$, $R_2$ and $R_3$ are each a hydroxyalkyl group containing from 2 to 8 carbon atoms which may be the same or different.

The above named additives are made by combining the appropriate number of moles of alkylene oxides with one mol of alkylene diamine in accordance with well known procedures.

It is within the scope of this invention to employ different hydroxyalkyl groups within a given compound.

Typical suitable compounds range from mono-, di- and tri-hydroxyethylated ethylene diamine to mono-, di- and tri-hydroxyoctylated hexamethylene diamine.

Mixtures of these compounds may be employed within the total proportions set forth herein.

The quaternary ammonium compounds resulting from the reaction of the hydroxyalkylated alkylene diamines with alkyl or alkyl aryl halides or salts may be employed for the purposes of this invention. This is also true of the acid salts resulting from reacting the hydroxyalkylated diamines with acids.

It has been discovered in the course of experimentation with materials of the type described above that certain additives having short chain substituent groups tend to cause puffing or the formation of blowholes during extrusion or molding. The permissible chain length is dependent on the degree of substitution in a complex manner. In general, the shortest acceptable chain length is increased as the degree of substitution is decreased. The situation is adequately covered if only those additives are used which have a vapor pressure less than 760 mm. at 225° C. If more volatile compounds are used, gassing during extrusion or molding becomes objectionable. While additives having the above described tendency to gas are obviously undesirable in compositions which are to be handled at high temperatures, such materials can be used to make up a minor proportion of the total additive when used in company with preferred additive.

By incorporating any of the above mentioned additives in polystyrene or other resinous polymers the destaticizing properties are attained without incurring any of the undesirable features enumerated above. The quantity of additive employed is between 1 and 10% by weight based on the total product and preferably between 2 and 7%. The upper limit is a matter of choice dictated by considerations of economy and is not critical. For example, 15% or more may be used and the desired destaticizing results obtained, although at higher concentrations there is danger of affecting physical properties adversely.

Be it observed that it will often be advantageous to prepare a master batch of resin with incorporated additive, said master batch containing as much as 50% additive which is far more additive than is recommended for use in molding operations and being later cut back by extrusion or by being otherwise blended with untreated resin. Such a concentrate may well be sold, particularly in the "clear" or "natural" color for blending with untreated resin of various colors or of its own color.

By way of illustration, there are given hereinafter a number of examples wherein the additive, quantity of additive and the resinous polymer employed are varied. Since hundreds of combinations are possible, it becomes impractical to show more than a few typical compositions with additives so selected from the described group as to show operability of the group as a whole and therefore such examples shall not be regarded as limiting in any sense.

Where it is desired to prepare a master batch or to market a concentrated blending material, the procedures of Examples 15 and 17 are preferred. In plants where mass polymerization is employed, the procedures of Examples 14 and 17 will be especially useful.

In cases where plastic chip is to be treated or where the polymerization methods in use are not adapted to taking advantage of the processes mentioned above, the process of Example 8 is preferred for its simplicity and freedom from extra drying steps.

Where it is desired to incorporate pigment in the plastic as well as to render it anti-static, the process of Examples 1 and 2 is preferred. This procedure is claimed in our copending application entitled "Process for Making Plastic Compositions," Serial Number 532,132, filed September 2, 1955.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with a particular example of this last mentioned procedure, from 0.1 to 1.0 pound of the additive is dissolved in 1 pound of isopropyl alcohol. Sufficient comminuted resinous polymer to make a total of 10 pounds of additive plus polymer is mixed with the solution. The alcohol is then evaporated in an exhaust oven at 65° C. for 36 hours with occasional agitation, so as to leave the polymer granules uniformly coated with said additive.

The coated material is then fed through a Windsor type RC-65 twinscrew extruder equipped with a series of ⅛" square orifices. The die and barrel are maintained at a suitable temperature for the particular polymer, such as 400° F. for polystyrene. The extruded material may then be chopped up into molding granules.

The molding granules may then be injection molded, as for example on a Reed-Prentice 8-ounce injection molding press with a heater temperature of 550° F. for polystyrene. For other polymers, conventional molding temperatures prescribed by the polymer supplier may be employed.

As a test of the effectiveness of the additive the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter the potential may be measured between the molding and ground immediately after withdrawal from the mold.

As a control means, identical articles may be molded from the same polymer not using the additive.

*Example 1*

The foregoing procedure was carried out using the following composition:

| | Lbs. |
|---|---|
| Tri-hydroxypropylated ethylene diamine | 0.3 |
| Polystyrene Granules, 10–60 mesh (Monsanto Chemical Corp., L2020 PIX–6) | 9.7 |

The dust test showed the absence of charged areas. The electrostatic voltmeter reading was about 1 volt.

One control article was sprayed with the bentonite dust immediately after molding and a well defined fern-like pattern was immediately apparent. The same control article yielded a 20 volt reading on the electrostatic voltmeter upon removal from the mold. After long term storage, another unmodified polystyrene molding showed definite dust patterns whereas the modified polystyrene article showed but a few isolated gravity deposited grains.

The molding characteristics of the modified polystyrene were judged to be superior to that of the control or unmodified polystyrene by the molding machine operator on the basis of obviously improved ease of mold release and lower breakage of thin-walled moldings.

*Example 2*

The procedure of Example I was repeated with the exception that 0.1 gram of phthalocyanine blue was suspended in the alcohol and put through a colloid mill together with the additive prior to incorporation into the polystyrene. The resulting molded product was a uniform attractive pale blue color.

When tested as in Example 1, the molding and destaticizing characteristics were found to be identical to the treated product of Example 1.

*Example 3*

Example 1 was repeated using the same additive in a concentration of 1% by weight of the total product. The resulting molding exhibited poor non-electrostatic properties, as measured by the Keithley voltmeter. A small amount of dust was collected in patterns after storage for two weeks.

*Example 4*

Example 1 was repeated using 0.9 lb. of the same additive and 9.1 lbs. of polystyrene. A slight improvement in destaticizing properties was noted.

Example 5

The procedure of Example 1 was repeated with 0.6 lb. of monohydroxyethylated ethylene diamine and an extruder barrel and die and molding temperature of 375° F. utilizing 9.4 lbs. polymethylmethacrylate as the resinous polymer. The resultant molding had substantially the same hardness as an unmodified control molding and exhibited excellent non-static and molding properties, the Keithley voltmeter reading less than 1 volt directly after the molding operation.

Example 6

The procedure of Example 1 was repeated using tri-hydroxyethylated ethylene diamine. The results were comparable.

Example 7

2.0 lbs. of isopropyl alcohol and 1.0 lbs. of trihydroxyoctylated hexamethylene diamine were mixed together to form a solution of watery consistency. The foregoing mixture was worked in a sigma blade mixer with 9.0 lbs. of polystyrene granules. After 10 minutes, the particles were found to be coated with the additive. The coated particles were then dried at 65° C. for 24 hours to remove the alcohol. The coated particles were then put through the extruder, chopped and molded as in Example 1. The resulting products showed substantially the same properties as the modified compositions of Example 1.

Example 8

0.6 lb. of monohydroxypropylated ethylene diamine and 9.4 lbs. of polystyrene granules as used in Example 1 were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during a 30-day storage test.

Example 9

The procedure of Example 8 was repeated using 9.4 lbs. of a so-called high impact polystyrene which was a plastic alloy of 85% polystyrene, 3% polybutadiene, 10% polyacrylonitrile and 0.6 lb. of di-hydroxybutylated butylene diamine.

The molded product was compared with a control specimen prepared in identical fashion with the exception that the additive was omitted. The two specimens were opaque in appearance. Immediately after molding, the treated material showed a charge of about 1 volt whereas the unmodified control showed a charge of 18 volts.

Example 10

The procedure of Example 8 was repeated using 0.6 lb. of di-hydroxypropylated butylene diamine, 9.4 lbs. of polyvinyl chloride and a die temperature of 390° F. The resulting molded articles were similar in appearance to unmodified polyvinyl chloride and exhibited excellent molding and anti-static properties. The electrostatic voltmeter test yielded a reading of about 2 volts whereas untreated polyvinyl chloride showed a reading of 20 volts upon molding.

Example 11

The procedure of Example 1 was repeated with an extruder barrel and die temperature of 350° F. utilizing ⅛″ polyethylene pellets as the resinous polymer and a tri-hydroxypropylated trimethylene diamine as the additive. Molding was carried out at 400° F. Immediately after molding, a Keithley voltmeter reading of about 1.5 volts was noted.

Example 12

Example 8 was repeated using di-hydroxyethylated propylene diamine. The results were comparable.

Example 13

Example 8 was repeated using the same quantities and resin but employing tri-hydroxypropylated butylene diamine as the additive. The results were substantially identical.

Example 14

60 grams of di-hydroxypropylated butylene diamine dissolved in 60 grams of water, were incorporated into 666 grams of polystyrene emulsion containing 30% polystyrene solids.

760 grams of granulated polystyrene were placed in a Baker-Perkins mixer. With the mixer in operation, the polystyrene emulsion additive mixture was slowly added. The resultant slurry was then dried at 65° C. for 48 hours at which time it was found to be water free. The resultant mixture which contained 6% of the additive, when molded as in Example 1, yielded moldings which when tested as in Example 1, exhibited destaticized characteristics similar to the modified product of Example 1.

Example 15

40 grams of monohydroxyethylated propylene diamine, dissolved in 40 grams of water, were added to 400 grams of a 30% solids polystyrene emulsion. This mixture was spray-dried and gave a free-flowing polystyrene powder containing 1 part of the additive to 3 parts of polystyrene. The resultant concentrate was tumbled with 340 grams of a granulated polystyrene. The resultant blend was injection molded under conventional polystyrene molding conditions and yielded destaticized moldings having properties comparable to that produced by the procedures of Example 1.

Example 16

2.4 grams of α,α′azodiisobutyronitrile was dissolved in 960 grams of monomeric styrene along with 40 grams of tri-hydroxypropylated ethylene diamine. The solution was placed in a heated agitated reaction kettle into which nitrogen was bubbled. The styrene solution was heated at 70° C. for 1½ hours until an exothermic reaction took place. The reaction was continued for an additional 30 minutes with the temperature being gradually increased to 90° C. until considerable polymerization took place as evidenced by an increase in viscosity. The mixture was transferred to air-free containers which were then sealed. The containers were maintained at a temperature of 90° C. for 48 hours. The resultant polymer was extruded, chopped and injection molded under normal polystyrene molding conditions. Moldings were clear and appeared equivalent to conventional polystyrene, except that when rubbed with a wool cloth, they would not become electrostatically charged as does unmodified polystyrene when so rubbed.

Example 17

2.0 grams of α,α′azodiisobutyronitrile was dissolved in 800 grams of monomeric styrene, along with 200 grams of di-hydroxypropylated ethylene diamine. The solution was placed in a heated reaction kettle into which nitrogen was bubbled. The solution was heated at 70° C. for 1½ hours until an exothermic reaction took place. The reaction was continued for an additional 30 minutes during which the temperature was gradually increased to 90° C. Considerable polymerization took place as evidenced by an increase in viscosity. The mixture was transferred to air-free containers which were then sealed. The containers were maintained at a temperature of 90° C. for 48 hours. The resultant polymer was extruded and chopped into granules. Later, 300 grams of the granules were mixed, 700 grams of untreated polystyrene molding compounds and extruded, chopped and injection molded under normal conditions for polystyrene. The quality of the resulting moldings was in all respects equal to that of the moldings of Example 1.

For the purpose of illustrating the invention, examples have been shown of the application of our invention to plastic alloys of polystyrene, polyethylene, polyvinyl chloride and polymethylmethacrylate and their copolymers. We wish it to bet understood that the invention likewise may be utilized in treating others such as polyacrylonitrile, polyfluoroethylenes, polytrifluoromonochloroethylene, polybutadiene, halogenated polystyrenes and mixtures and copolymers of these materials.

The term "vinylidene" as used herein is intended to define monomers containing a polymerizable unsaturated ethylenic

structure and is generic to vinyl and vinylidene monomers. Each of the polymers specifically exemplified in the preceding examples, namely: polystyrene, polymethylmethacrylate, polyvinyl chloride and polyethylene is a polymer of a vinylidene monomer, so defined.

By "plastic alloy" as used herein we intend to encompass compositions comprising two or more types of polymeric molecules whether prepared by copolymerization or by intimate mixing.

Mixtures of the various disclosed additives may be employed providing the total amount is within the disclosed proportions for a single specie.

While we have disclosed what is at present considered the best mode for carrying out our invention, we appreciate that it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A composition of matter consisting of a polymer of vinylidene monomers and mixtures of said polymers, and containing from 1% to 50% by weight, based on the weight of the polymer; of an antistatic agent consisting of a partially hydroxyalkylated alkylene diamine of the group represented by the formula

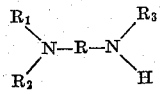

in which R is an alkylene radical containing from 2 to 6 carbon atoms and at least one of $R_1$, $R_2$ and $R_3$ is a hydroxyalkyl group containing from 2 to 8 carbon atoms, the remaining members of the group $R_1$, $R_2$, and $R_3$ being selected from the group consisting of hydrogen and hydroxyalkyl groups containing from 2 to 8 carbon atoms.

2. The composition of claim 1 wherein the alkylene diamine constitutes between 1% and 10% by weight based on the weight of the polymer.

3. The composition of claim 1 wherein the alkylene diamine constitutes between 2% and 7% by weight based on the weight of the polymer.

4. The composition of claim 1 wherein the hydroxyalkylated diamine is one having a vapor pressure less than 760 mm. at 225° C.

5. The composition of claim 1 wherein said partially hydroxylated alkylene diamine is a partially hydroxypropylated alkylene diamine containing from 1 to 3 hydroxypropyl groups and said alkylene radical contains from 2 to 6 carbon atoms.

6. The composition of claim 1 wherein said partially hydroxyalkylated alkylene diamine is a partially hydroxypropylated ethylene diamine containing from 1 to 3 hydroxypropyl groups.

7. The composition of claim 1 wherein said partially hydroxyalkylated alkylene diamine is a partially hydroxypropylated propylene diamine containing from 1 to 3 hydroxypropyl groups.

8. The composition of claim 1 wherein said partially hydroxyalkylated alkylene diamine is a partially hydroxypropylated butylene diamine containing from 1 to 3 hydroxypropyl groups.

9. The composition of claim 1 wherein said partially hydroxyalkylated alkylene diamine is a partially hydroxyethylated alkylene diamine containing from 1 to 3 hydroxyethyl groups and said alkylene radical contains from 2 to 6 carbons atoms.

10. The composition of claim 1 wherein said polymer is polystyrene.

11. The composition of claim 1 wherein said polymer is polyvinyl chloride.

12. The composition of claim 1 wherein said polymer is polyethylene.

13. The composition of claim 1 wherein said polymer is polymethylmethacrylate.

14. A composition of matter comprising the emulsion of a vinyl polymer and a partially hydroxyalkylated alkylene diamine, containing from 1 to 3 hydroxyethyl groups and said alkylene radical contains from 2 to 8 carbon atoms.

15. A composition of matter comprising the emulsion of a vinyl polymer and a partially hydroxyalkylated alkylene diamine containing from 1 to 3 hydroxyethyl groups and said alkylene radical contains from 2 to 8 carbon atoms, having a vapor pressure less than 760 mm. at 225° C.

References Cited in the file of this patent

UNITED STATES PATENTS

| | | |
|---|---|---|
| 2,403,960 | Stoops et al. | July 16, 1946 |
| 2,450,552 | Hurdis | Oct. 5, 1948 |